United States Patent [19]

Snyder

[11] Patent Number: 4,931,934

[45] Date of Patent: Jun. 5, 1990

[54] METHOD AND SYSTEM FOR MEASURING CLARIFIED INTENSITY OF EMOTION

[76] Inventor: Thomas E. Snyder, 10 Allen Rd., Wellesley, Mass. 02181

[21] Appl. No.: 211,706

[22] Filed: Jun. 27, 1988

[51] Int. Cl.$^5$ .............................................. G09B 19/00
[52] U.S. Cl. .................................... 364/419; 434/236; 434/237
[58] Field of Search ................ 364/419; 434/236, 232, 434/238

[56] References Cited

U.S. PATENT DOCUMENTS

| | | | |
|---|---|---|---|
| 3,691,652 | 9/1972 | Clynes | 434/236 |
| 3,748,750 | 7/1973 | Viemeister | 434/236 |
| 4,041,617 | 5/1977 | Hollander | 434/237 |

Primary Examiner—Jerry Smith
Assistant Examiner—Kim T. Tbui
Attorney, Agent, or Firm—Hale and Dorr

[57] ABSTRACT

Disclosed is a system and method for measuring the emotional response of a subject to a chosen focus in order to reliably produce objective data representing that emotional response. The subject is put in contact with the chosen focus, and the emotional response of that subject to the chosen focus is determined in order to provide initial response emotions and the intensities of these emotions. The intensity of these same emotions without attention directed to the chosen focus is also evaluated in order to provide tabulated baseline intensities. Utilizing the initial response emotion intensities and the baseline emotion intensities, clarified emotion intensities are determined for use in a variety of decision making applications.

12 Claims, 7 Drawing Sheets

| EMOTION | BASELINE INTENSITY | REACTION INTENSITY | CLARIFIED INTENSITY |
|---|---|---|---|
| HAPPY | 0 | 4 | 4 |
| SAD | 4 | 1 | -3 |
| ANGRY | -2 | 1 | 3 |
| LOYAL | +2 | 5 | 3 |
| READY | 8 | 0 | -8 |

PLEASE REVIEW THE ABOVE DATA.

| BODY LOCATION | PHYSICAL SENSATION | EMOTION |
|---|---|---|
| HEAD | BUZZ | |
| BACK | TICKLE | HAPPY! |
| NOSE | ITCH | |
| CHEST | TIGHTNESS | ANGRY! |
| FINGERS | | READY |
| MOUTH | | SAD |
| EARS | | LOYAL |

PLEASE REVIEW THE ABOVE DATA.

METHOD AND SYSTEM FOR MEASURING CLARIFIED INTENSITY OF EMOTION

BACKGROUND OF THE INVENTION

This invention relates to a method and system for measuring an emotional response to a chosen focus and more particularly to a method and system for producing objective data reflecting the extraction of personal idiosyncrasies from a standard subjective reaction in order to more accurately predict action to be taken by an individual subject or the normative population in response to the chosen focus.

Heretofore, several approaches for measuring emotion to infer action have been tried. The idiosyncratic nature of self reporting has led to a general disregard of subjective reports. With objective checklists and other forced choice questionnaire formats, emotion prediction data has proven extremely sensitive to psychological expectations and demand characteristics of the procedures. Focus groups traditionally rely on exceptional individuals to function as facilitators. Inevitably, the strengths of the facilitator run aground on group dynamics, semantic ambiguity, and difficulties in generalizing to the whole population.

Efforts to utilize subconscious emotion rely on projective techniques whereby the individual subject recognizes and identifies emotions evoked by an ambiguous stimulus or situation. An ambiguous stimulus is any object that evokes a variety of spontaneous thoughts or feelings. Examples of projective techniques include word association, sentence completion, cartoon completion, and role playing. The Rorschach Inkblot Test and the Thematic Apperception Test are standardized projective techniques which generate common responses to ambiguous dark figures on a light background that are valuable to clinicians familiar with in depth mental processes and interpersonal themes. The meanings of these responses to these ambiguous stimuli and situations are only variably recognized by the individual subject. The useful information produced is limited by its not being validatable by the individual subject as representing his true and whole response to the chosen focus. The predictive information produced is limited by the weak quantifiability of the data and the presence of transient and idiosyncratic emotional elements. The absence of a baseline that might control for these elements greatly reduces the ability to predict action and fails to justify generalizing from the individual to predict behavior in a normative population.

Another problem encountered in measuring emotion is that, in general, individual resistance to emotion in society is profound, as most people strive to control and suppress emotions because they are too frequently unreliable, impulsive, irrational, overwhelming, and deep. This problem is, in effect, linked to unconscious mental processes that are dimly understood.

Traditional unconscious psychology presents a no win situation regarding emotion. It precludes any confidence in a less deep grounding of emotion because explicitly and implicitly there exist always deeper and truer emotions. Empirical approaches to emotion have not thrived with current introspective and projective techniques. However, the realm of preconscious emotion, that emotion which is unappreciated but recognizable, represents an accessible domain for empirical exploration of spatial and temporal characteristics of emotion. Computer processing technology can enable empirical studies to establish preconscious emotion as a reference level for a more popular appreciation of the role of emotion occurring throughout the broad range of human endeavors.

It is therefore a principal object of the present invention to provide a method and system for measuring emotional response that reliably produces objective and predictive data regarding human behavior.

It is a further object of the present invention to provide a method and system for measuring emotional response that is engaging, non-threatening, and infinitely forgiving for the broad range of potential styles that individual subjects might employ in an interactive setting.

Another object of the present invention is to provide a method and system for measuring emotional response that enables a time-bound graphing of individual emotions for developing a preconscious baseline that characterizes the individual subject and for extracting the baseline from a standard subjective reaction of the subject to a chosen focus to derive a clarified intensity of emotion that is predictive of action to be taken by the individual subject or, by logical extension, the normative population.

Still another object of the present invention is to provide a method and system for measuring emotional response that will accumulate preconscious baseline profiles of individuals, families, and groups and their clarified responses to a variety of focuses to develop innovative profiles of segments of the whole population in a database.

SUMMARY OF INVENTION

Accordingly, a system and method is provided for measuring the emotional response of a subject to a chosen focus in order to reliably produce objective data representing that emotional response. A subject is put in contact with the chosen focus, and the emotional response and the intensity of the emotional response of that subject to the chosen focus is determined and represented as reaction intensities. Under the assumption that a subject has a prevailing emotional make-up, the system and method tabulate baseline intensities for the emotions in the original response. Subtracting the baseline intensities from the reaction intensities produces clarified emotion intensities which are useful in a variety of decision making applications.

These and other objects and features of the present invention will become apparent from the following detailed description which should be read in light of the accompanying drawings in which corresponding reference numerals refer to corresponding parts throughout the several views.

DETAILED DESCRIPTION OF THE PREFERRED EMBODIMENTS

Two intuitive yet innovative assumptions underlie the present invention. The first assumption is that each individual has an accumulatable whole preconscious emotional make-up. The second assumption is that this whole preconscious emotional make-up is present as a baseline that can be tapped at any time and, with proper means, measured.

Figure 1:
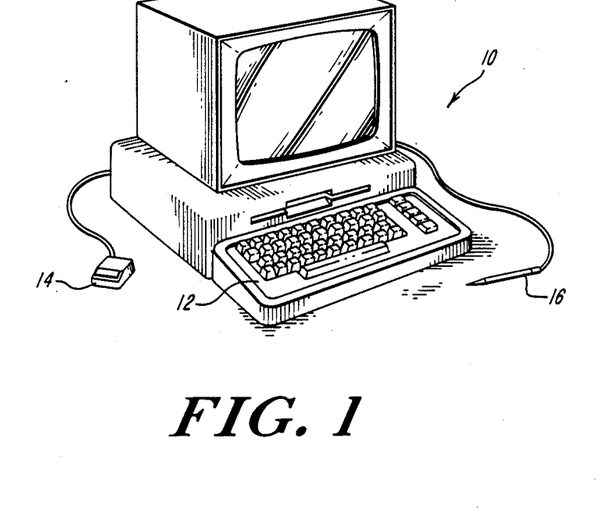
FIG. 1 is a schematic view of the components of the system for measuring emotional response of the present invention.

Referring to FIG. 1, the system 10 of the present invention includes a keyboard 12 and a peripheral drawing device 14 which enable the individual subject utilizing the system and method of the present invention to provide input responses to the system 10. These input responses include personal memories, thoughts, and emotions and are expressed through a combination of typing on the keyboard 12, creating graphical images using the peripheral drawing device 14, and making selections preferably by using a peripheral-to-screen pointing device 16. In some embodiments drawing device 14 and pointing device 16 can be the same device.

Figure 2A:
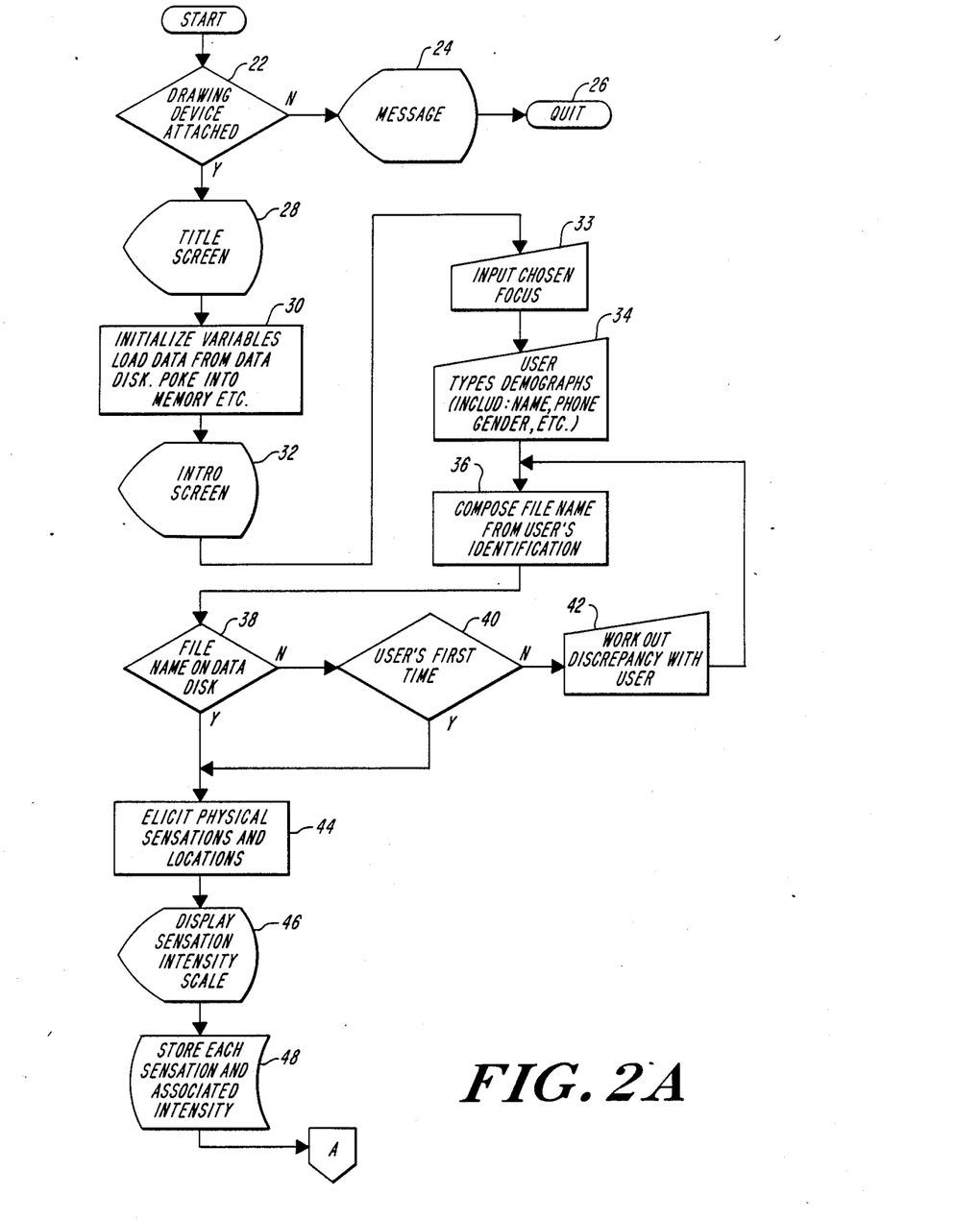
FIGS. 2a-2d are a flow chart of the basic steps utilized by the system and method for measuring emotional response of the present invention.
Figure 2B:
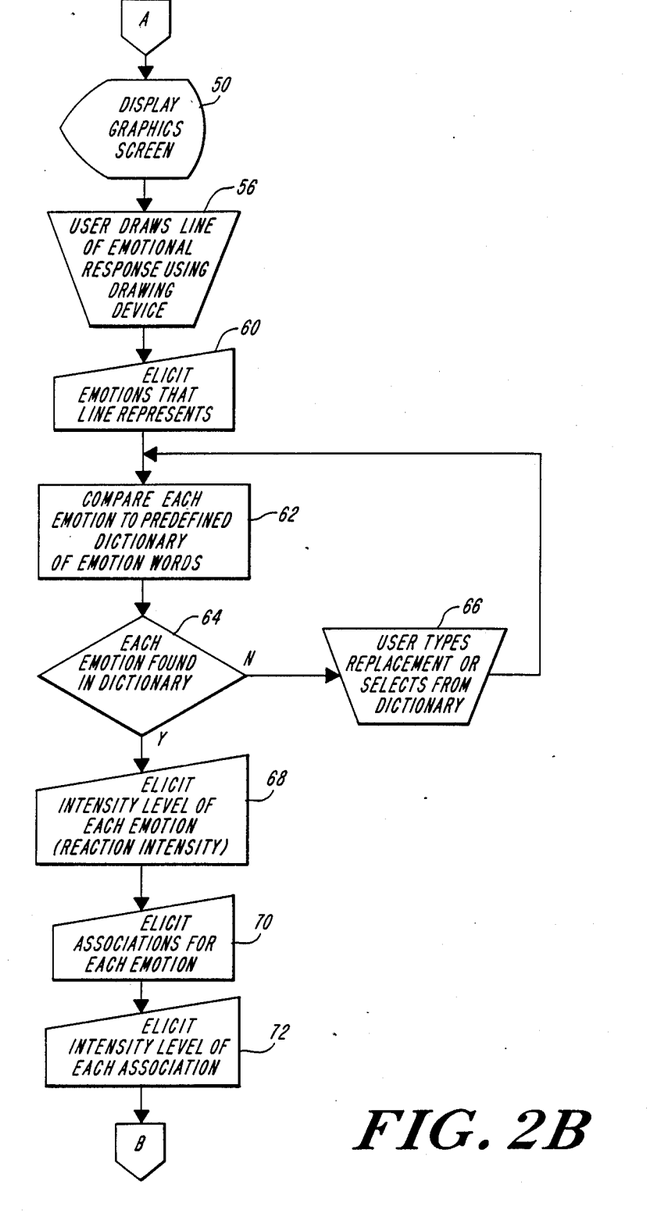
Figure 2C:
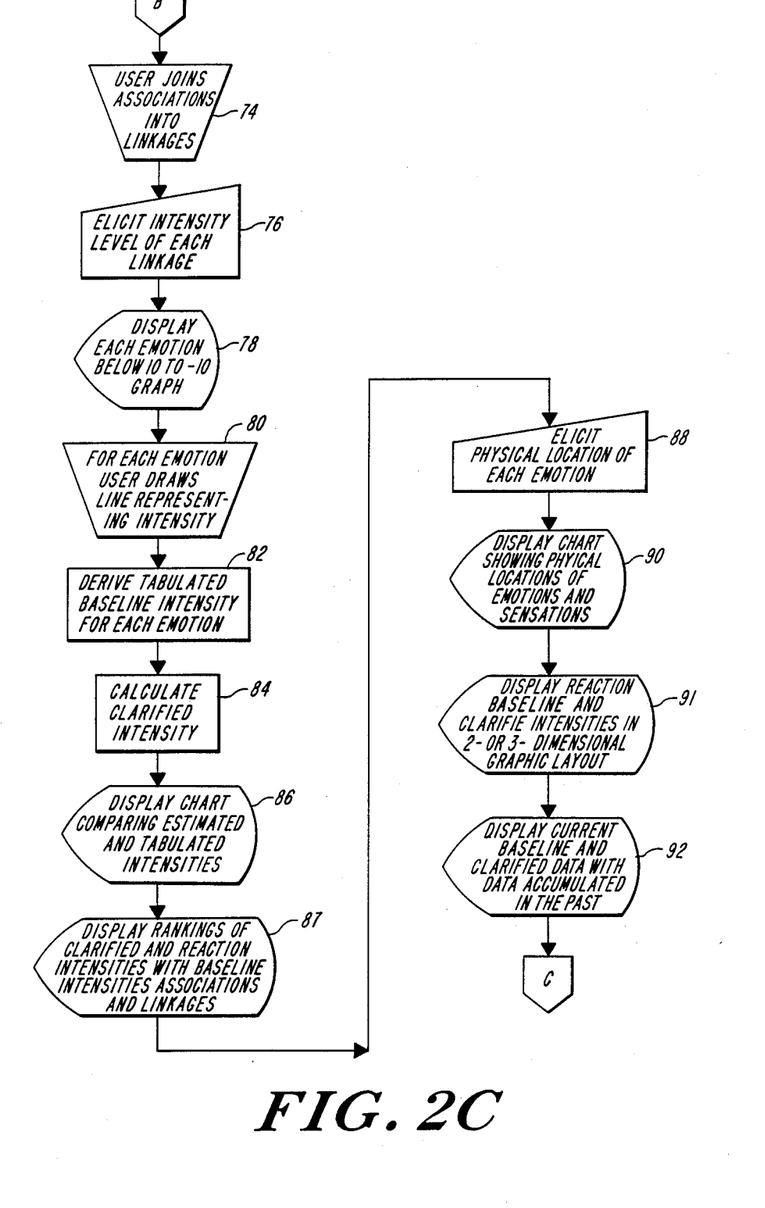

Referring to FIGS. 2a-2c, when the user initially turns on the system 10, the system will test in step 22 whether a drawing device is attached. If the drawing device is not attached, a message to that effect is produced in step 24, and the system will not proceed any further and will quit in step 26. If a drawing device is attached, a title screen is displayed by the system in step 28. In step 30 the system will then begin its processing operation by initializing variables and loading data from a data disk. In step 32 an introductory screen explaining the basic operation of the system is provided, and in step 33 the subject is requested to type the chosen focus. A chosen focus may be, for example, a product which is presented to the subject for evaluation, a political candidate, a new movie, etc. In step 34 the subject records identifying information such as name or coded numerical identification, date of birth, gender, ethnic group, zip code, socioeconomic status (e.g. education, work, income) date, time, sponsoring organization, and number of previous exposures to the system.

After receiving the information input by the subject, the system sets up a file which is based on the subject's name or coded numerical identification so that each subject will have his or her own unique file. The system then checks, in step 38, whether the file name is present on the data disk, and if it is not, a message is sent to the subject in step 40 inquiring whether it is the subject's first time utilizing the system. If it is not the subject's first time, step 40 will send a message to the subject asking the subject to retype his identification. Operation of the system then switches back to step 36, and the system will once again try to compose a file name from the retyped subject's identification. If the file name is on the data disk, the system will then begin to elicit physical sensations and their body locations from the subject.

The subject initiates the guided introspective process by identifying body locations where physical sensations, such as tingling or ache, are currently being felt. These identifications assist the subject in differentiating the physical sensations from emotions experienced during operation of the system. Sensation intensities are assigned by the subject on the basis of how strongly each physical sensation is felt. In one embodiment a Likert scale of 1 to 10 is presented to the subject on the screen for each experienced physical sensation. The subject simply determines how strongly he or she feels the sensation and then selects a number representing the relative strength.

Figures 2D, 3:
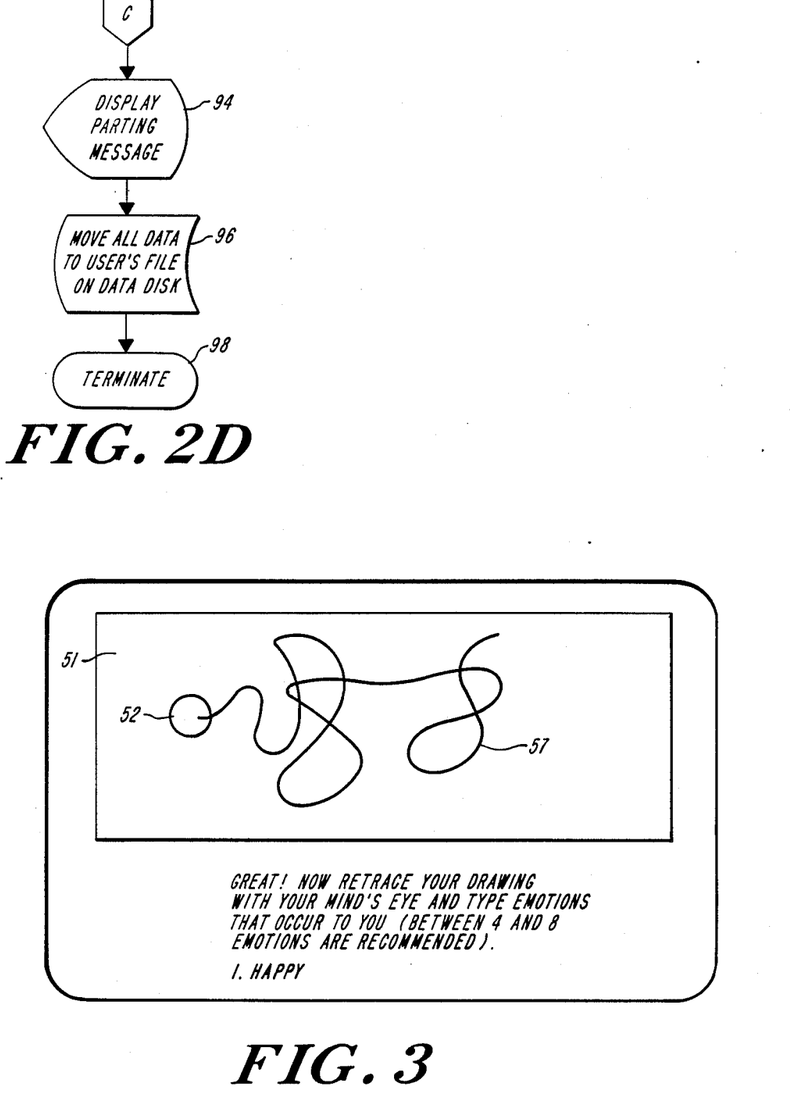
FIG. 3 is a reproduction of a screen display used by the system and method of FIGS. 1 and 2 of the present invention for allowing a subject to draw a line representing the chosen focus.

The system then directs the subject's attention to the chosen focus and displays, in step 50, a drawing screen 51 with an origin 52, an embodiment of which is shown in FIG. 3. The system then requests the subject in step 53 to reflect on the chosen focus. After this period of reflection, the subject in step 56 draws a line 57 on the screen using the peripheral drawing device 14 to spontaneously represent what is being felt and thought about the chosen focus. This line 57 may take any form and usually will include peaks and valleys. The drawing of the line is a pure, mostly subconscious, projection which serves as an ambiguous stimulus onto which is next projected emotion words.

After the line is drawn, the system prompts the subject to retrace the line 57 in his or her mind and to assign emotion words (i.e. words representing emotions) to the ambiguous stimulus by typing emotion words on keyboard 12 in step 60. These emotion words pertain to various segments of the line.

A computer-based dictionary of a finite number of emotion words is stored by the system 10 in its memory. The system looks up each emotion word in the dictionary in step 62, and if the emotion word is not present in the dictionary, the system notifies the subject, and the subject accesses the dictionary to select the most approximate emotion in step 66. The dictionary is preferably divided into subsets of words representing related emotions. The subject accessing the dictionary selects the subset closest to the desired emotion word, and then selects the word in that subset that best describes the experienced emotion. The use of subsets speeds up the process of choosing the most appropriate emotion word. Once an emotion word is chosen that is present in the dictionary, the system requests the subject to assign intensity levels to each identified emotion according to how strongly each emotion is felt in relation to the chosen focus. This intensity level is consciously estimated and referred to as reaction intensity.

In step 70, the subject inputs on keyboard 12 brief phrases that are free associations, such as any personal experiences reminiscent of individual emotional responses to the chosen focus. For example, the chosen focus "Ollie North" may elicit the emotional response "warm" which may elicit "mother" and "apple pie". Association intensities are assigned by the subject in step 72 according to how strongly each association is felt with regard to the chosen focus.

With a final shift away from particular focus on the chosen focus, the system then prompts the subject in step 74 to link selected free associations together in a way to reflect personal life experience. For example, there may be a linkage of "apple pie" and "going to the bakery". The subject is presented with the list of emotions and their associations and selects only one association from each emotion in constructing any linkage. Two or more associations can be employed to construct any one linkage. Linkage intensities on a scale of 1 to 10 are assigned by the subject to reflect how prominently each linkage represents his or her life experience in general.

Figure 4:
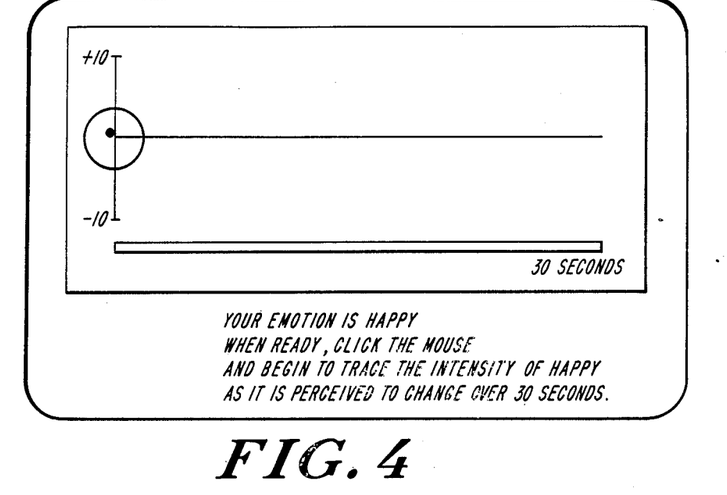
FIG. 4 is a graph used by the system and method of FIGS. 2a-2d for eliciting emotional baselines experienced by the subject.

Continuing to focus on himself or herself rather than the chosen focus, the subject is presented with a graph, as shown in FIG. 4, for each emotion. The subject in step 80 uses the peripheral drawing device 14 to graph on the screen the intensity of each individual emotion as it is perceived to change over a short, e.g. 30 second, time period. The scale runs from a high of +10 to a low of −10. The −10 value is chosen when the opposite emotion, e.g. happy --> sad, is perceived to emerge during the time period. The 0 (zero) value is chosen when no particular emotion, e.g. angry --> not angry, is perceived during the period. In step 82 the system integrates the areas above and below the horizontal axis, and subtracts the area below the horizontal axis from the area above the horizontal axis to derive a tabulated baseline intensity for each emotion.

Figure 5:
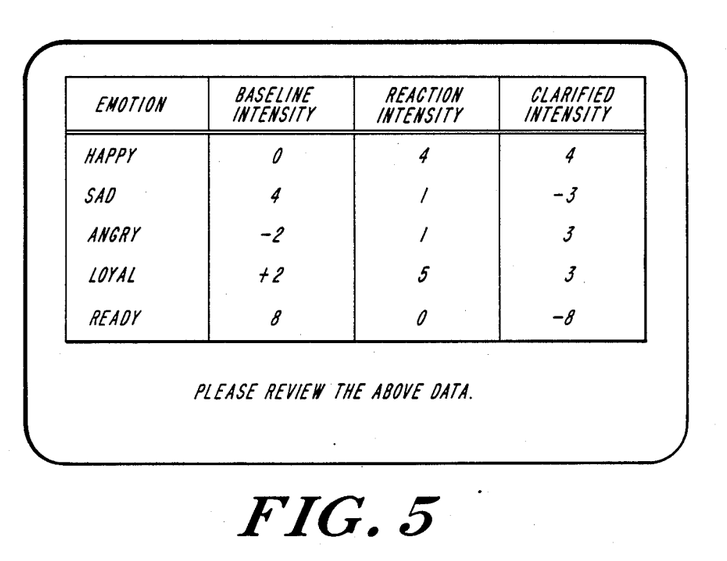
FIG. 5 is an example of an output chart produced by the system and method of the present invention to show the results of the processing of emotions.

At this point, the system subtracts the tabulated baseline intensity from the reaction intensity to arrive at the clarified intensity for each emotion in step 84. In step 86, all of this data is revealed in a chart, as shown in FIG. 5, which provides the information that most likely would or will guide the subject's behavior regarding the chosen focus in the near future.

In step 87 the system displays the emotions with the largest absolute values of clarified intensity. These emotions indicate the emotional paths of action with regard to the chosen focus. Clarified intensities with low absolute values are given little predictive value, while a clarified intensity of 0 (zero) by definition and design of this invention has absolutely no predictive value. Particular note is made where the clarified intensity rankings are far different than the reaction intensity rankings. This is where the subject at once sees the familiar, existing, conscious reaction intensity information juxtaposed with the new, strangely recognizable and clarifying, welcomed, preconsciously-derived clarified intensity information which indicates the path to action. Furthermore, the baseline data is presented for the subject to ascertain that the pattern of baseline intensities indeed represents a true depiction of himself or herself and hence a valid and innovative construct that can lead to and justify a recasting of the initial reaction data. Additionally, the subject has the opportunity to review the data of secondary importance—namely, his or her associations and linkages—which support a more elaborate personal interpretation of the results. For example, the associations corresponding to the emotions with highest absolute clarified intensities take on added significance in terms of behavior that would or will occur. In the linkages, the subject sees himself or herself as he or she is in a broad yet relevant context.

Figure 6:
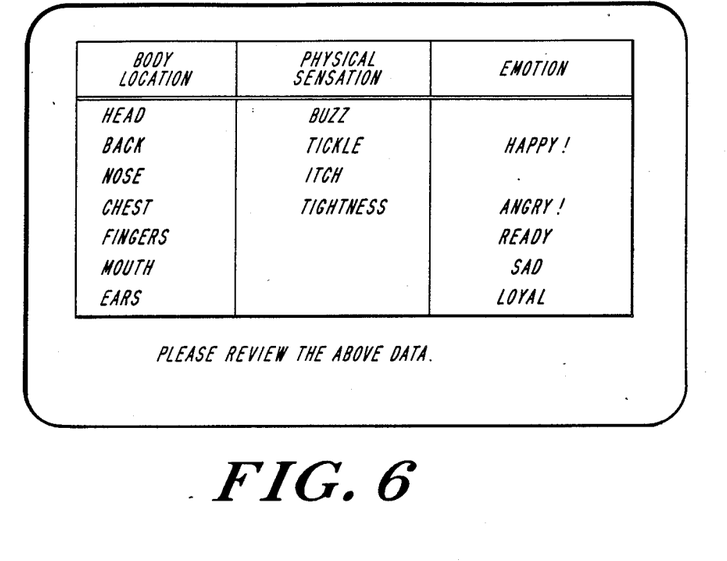
FIG. 6 is an example of an output chart used to correlate emotions and physical sensations by the system and method of the present invention.

Finally, in step 88 the subject assigns the individual emotions to body locations. The system provides a chart in step 90 (see FIG. 6) showing body locations and the assigned physical sensations and emotions. This chart may reveal that a certain physical sensation is a direct manifestation of a particular emotion. For example, "chest" and "tightness" and "anger", or "throat" and "dryness" and "ready", might coincide.

Figure 7:
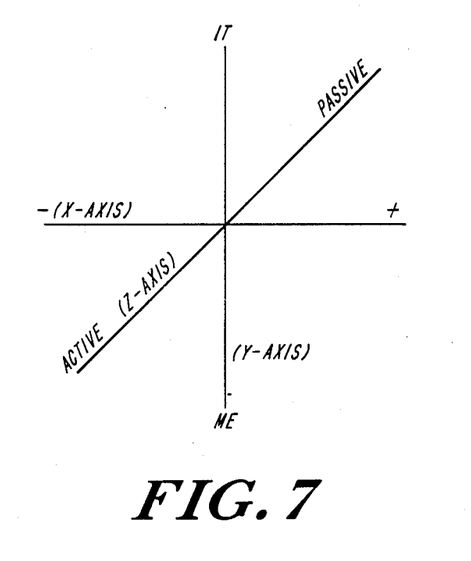
FIG. 7 is a 3-dimensional graph with labelled axes that represent the prime aspects of a structural analysis of emotion.

In step 91 the subject is given the option to visually inspect the primary data (baseline intensities, reaction intensities, and clarified intensities) graphed on a 2- or 3-dimensional layout which represents a model of a whole emotional make-up. The present model (see FIG. 7) is composed of emotion vectors originating at the origin in a 3-dimensional space whose axes represent prime aspects of a structural analysis of emotion, namely, the differentiation of emotions based on positive-negative (x-axis), it-me (y-axis), and active-passive (z-axis). For example, "loyal" is positive-it-active. The visual presentation of the primary data is particularly useful for the depiction of data accumulated by return or frequent users.

In step 92 the subject is given the option to examine current data in light of data accumulated in the past. Particularly relevant is past baseline data which serves as a statistically normative comparison for the current baseline. For example, if the baseline intensity for the current most predictive emotion falls significantly outside the norm for that emotion for the subject, then not quite as much confidence can be placed in the actionable information produced. The subject may also wish to compare the current actionable information with other actionable information, i.e. other emotional paths to action, produced in the past.

After processing has been completed, the system displays, in step 94, a parting message and all data is moved to the user's file on the data disk in step 96.

An independent overseer, for example, a market researcher, can collate group data to be analyzed and indicate which segmentations of the data are of interest. A statistical package can then be integrally employed to analyze the data and generate statistically refined 2- or 3- dimensional graphical profiles which characterize the primary output of the group data (reaction intensities, baseline intensities, and clarified intensities.) Online interactions with the database can be accomplished with fingertip ease and allow a variety of computer generated findings and selected hypotheses to be explored.

The system will also process the data to provide group and segmented data that (1) is cleansed of terminally anemic (blow out) data recognizable by tight clustering of emotions in the initial response to the chosen focus, e.g. when a subject is overwhelmed with anger, impatience, boredom, mania, depression, joy, etc.; and (2) shows baseline data compared with normative baseline data from whole population database. In addition to reviewing the primary data, the overseer can explore and select the secondary data that gives additional meaning to the primary data.

The system and method which has been described above has a wide variety of potential applications. For example, when used as a decision making tool, a corporate executive could in an expedient, insightful and precise manner see the next and/or ultimate step to be taken in the correct direction with regard to any strategic or competitive action being contemplated. This allows the corporate executive to tap the depth of his or her knowledge, experience and understanding to address continuing instability in the decision environment, gain intuitive grasp of total settings, define problems, differentiate significant factors from trivial factors, make choices amidst complex considerations, and develop self-motivation and goals. A closer engagement with the value systems of customers, competitors, suppliers, employees and even government is possible. To the degree the use of this invention filters down through management to the whole organization, each employee is empowered in his or her decision making process so that corporate meetings and communication can be made more productive and efficient. The process will involve the decision maker having ready access to the system and will begin by the selection of the chosen focus. After 15 minutes of interaction with the system and subsequent reflection, the decision maker will typically feel resolved about one or another course of action (or inaction).

When used as a market research tool, the system and method of the present invention allow marketing personnel to gather objective data that increases the dynamic understanding of consumer behavior, increases the appreciation of causal determinations, decreases the reliance on inferences, and decreases the variance in predicting consumer behavior. Steps in the entire chain of product and service development and marketing are enhanced, from concept testing, feature analysis, package testing, advertisement testing, to analysis of competition. The consumer's preferences can play a direct role in identifying key issues and strategic imperatives in a market place that is increasingly specialized and emotion-driven. The database provides access to normative data that can reduce the size and cost of market research studies, as well as constituting new segmentations of the whole population which can result in the discovery of new product opportunities. The process will involve the market researcher presenting a chosen focus to 10 to 300 subjects and then reviewing the results of the group data with attention given to salient results identified by the system as well as fingertip exploration of various hypotheses of interest.

In the educational area, the system and method of the present invention will find use in stress management as well as in self development applications, and when used as a clinical tool, the system and method can be used for psychotherapy purposes as well as for clinical assessment. In addition, the system and method also support applications in social science and communication fields as human reactions and preferences can be correlated with greater clarity and predictability to human action and behavior.

While the foregoing invention has been described with reference to its preferred embodiments, various alterations and modifications will occur to those skilled in the art. All such variations and modifications are intended to fall within the scope of the appended claims.

What is claimed is:

1. A method for measuring an emotional response of a subject to a chosen focus comprising the steps of:
   determining reaction emotions experienced by the subject when placed in contact with the chosen focus;
   determining an intensity level on a standard scale for each of said experienced reaction emotions;
   determining a corresponding baseline intensity for each of said reaction emotions experienced by the subject with the subject's attention being directed away from the chosen focus "wherein said baseline intensity represents an accumulatable whole preconcious emotional make-up";
   deriving a clarified emotion intensity by subtracting said corresponding baseline intensity from said intensity level.

2. The method for measuring an emotional response of a subject to a chosen focus of claim 1 wherein said step of determining reaction emotions comprises the steps of:
   presenting the chosen focus to the subject;
   receiving words representing emotions from the subject and comparing each word to a dictionary of words representing emotions;
   presenting an alternate listing of words representing emotions to the subject for each word not found in said dictionary and receiving an alternate word found in said alternate listing;
   storing said received words representing emotions.

3. The method for measuring an emotional response of a subject to a chosen focus of claim 2 wherein said step of receiving words representing emotions from the subject comprises the steps of:
   receiving a line drawn by the subject representing one or more emotions experienced by the subject in response to the chosen focus;
   eliciting words describing the one or more emotions represented by said line drawn by the subject.

4. The method for measuring an emotional response of a subject to a chosen focus of claim 1 wherein said step of determining baseline intensities comprises the steps of:
   directing the subject's attention away from the chosen focus;
   presenting a graph to the subject for each reaction emotion and receiving a line drawn by the subject representing the intensity of each reaction emotion over a period of time;
   processing said line to derive a baseline intensity of each emotion.

5. The method for measuring an emotional response of a subject to a chosen focus of claim 4 wherein said graph includes positive regions and negative regions and wherein said step of processing said line to derive a baseline intensity for each emotion comprises the steps of integrating said positive regions and negative regions to obtain a first integrated area and a second integrated area and subtracting said second integrated area from said first integrated area.

6. The method for measuring an emotional response of a subject to a chosen focus of claim 1 further comprising the steps of:
   eliciting physical sensations currently experienced by the subject and the body locations of these physical sensations on the subject;
   determining the intensity of each of said elicited physical sensations.

7. A system for measuring an emotional response of a subject to a chosen focus comprising:
   means for eliciting reaction emotions experienced by the subject when placed in contact with the chosen focus;
   means for determining the intensity level on a standard scale for each of said experienced reaction emotions;
   means for eliciting a corresponding baseline intensity for each of said reaction emotions experienced by the subject with the subject's attention directed away from the chosen focus "wherein said baseline intensity represents an accumulatable whole preconcious emotional make-up";
   means for deriving a clarified emotion intensity by subtracting said corresponding baseline intensity from said intensity level.

8. The system for measuring an emotional response of a subject to a chosen focus of claim 7 wherein said means for eliciting reaction emotions comprises:
   means for displaying the chosen focus to the subject;

means for receiving words representing emotions from the subject and means for comparing each received word to a dictionary of words representing emotions;

means for presenting an alternate listing of words representing emotions to the subject for each word not found in said dictionary and means for receiving an alternate word found in said alternate listing;

means for storing received words representing emotion.

9. The system for measuring an emotional response of a subject to a chosen focus of claim 8 wherein said means for receiving words representing emotions comprises;

means for receiving a line drawn by the subject representing one or more emotions experienced by the subject in response to the chosen focus;

means for eliciting words describing the one or more emotions represented by said line drawn by the subject.

10. The system for measuring an emotional response of a subject to a chosen focus of claim 7 wherein said means for determining baseline intensities comprises:

means for directing the subject's attention away from the chosen focus;

means for providing a graph to the subject for each reaction emotion and means for allowing the subject to draw a line representing the intensity of each reaction emotion over a period of time;

means for processing said line to derive a baseline intensity of each reaction emotion.

11. The system for measuring an emotional response of a subject to a chosen focus of claim 10 wherein said graph includes positive regions and negative regions and wherein said system comprises means for processing said line to derive a baseline intensity for each emotion by integrating said positive regions and negative regions to obtain a first integrated area and a second integrated area, and subtracting said second integrated area from said first integrated area.

12. The system for measuring an emotional response of a subject to a chosen focus of claim 7 further comprising the system of:

means for eliciting physical sensations currently experienced by the subject and the body locations of these physical sensations on the subject;

means for determining the intensity of each of said elicited physical sensations.

* * * * *